Oct. 8, 1968 J. E. HEIDER 3,405,210
METHOD AND APPARATUS FOR EXTRUDING PLASTIC MATERIAL
Filed March 18, 1966 3 Sheets-Sheet 1

INVENTOR.
JAMES E. HEIDER
Philip M. Rice
& W. a. Schaich
ATTORNEYS

Oct. 8, 1968  J. E. HEIDER  3,405,210

METHOD AND APPARATUS FOR EXTRUDING PLASTIC MATERIAL

Filed March 18, 1966  3 Sheets-Sheet 2

INVENTOR.
JAMES E. HEIDER
BY Philip M. Rice
& W. A. Schaich
ATTORNEYS

Oct. 8, 1968   J. E. HEIDER   3,405,210
METHOD AND APPARATUS FOR EXTRUDING PLASTIC MATERIAL
Filed March 18, 1966   3 Sheets-Sheet 3
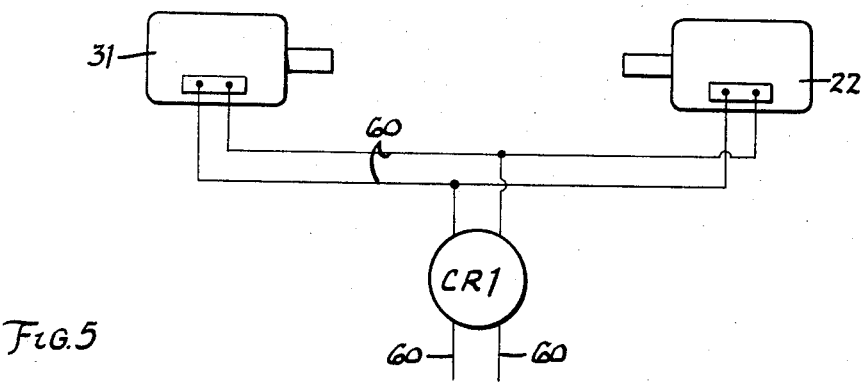
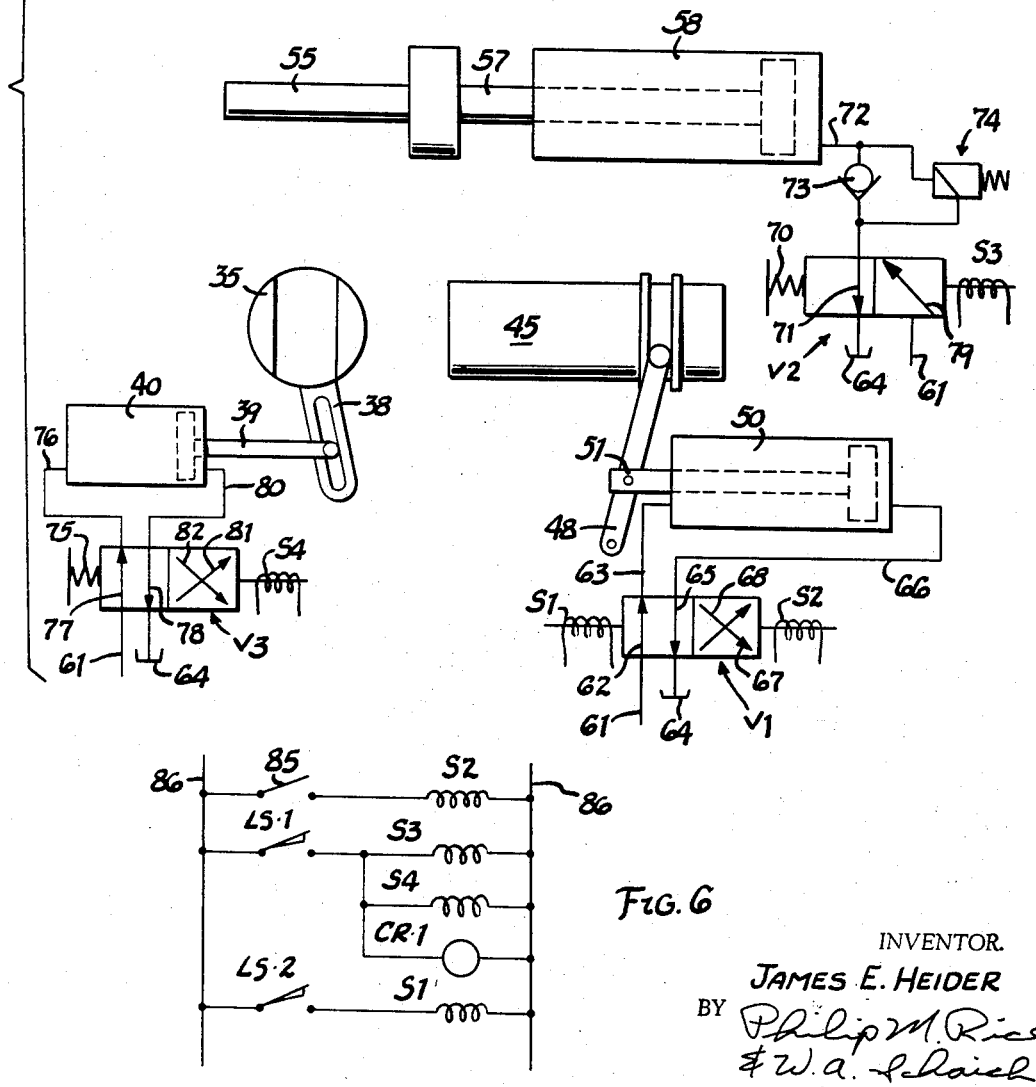
INVENTOR.
JAMES E. HEIDER
BY Philip M. Rice
& W. A. Raich
ATTORNEYS

# United States Patent Office 3,405,210
Patented Oct. 8, 1968

3,405,210
METHOD AND APPARATUS FOR EXTRUDING PLASTIC MATERIAL
James E. Heider, Toledo, Ohio, assignor to Owens-Illinois, Inc., a corporation of Ohio
Filed Mar. 18, 1966, Ser. No. 535,484
7 Claims. (Cl. 264—176)

The present invention relates to an elastic melt extruder and more particularly to an elastic melt extruder capable of issuing plasticized material at pressures greater than those normally generated in the elastic melt gap.

There has been recently developed a new type of plasticizer-extruder, commonly known as an "elastic melt extruder" utilizing "the normal force effect" (i.e., the normal force developed when a visco-elastic material is sheared between a rotating plate and a stationary plate) to perform the functions of the conventional plasticizer-extruder. Such an elastic melt extruder is described in detail in "Modern Plastics" magazine of October 1959, at page 107, in an article by Bryce Maxwell and Anthony J. Scalora. A specifically improved version of this elastic melt extruder is disclosed in patent application Ser. No. 349,241, filed Mar. 4, 1964, of N. J. Curto and J. E. Henry, now Patent No. 3,351,694, said application being assigned to the assignee of the present invention.

While conventional elastic melt extruders are capable of plasticizing large quantities of thermoplastic material, such extruders generally have one appreciable drawback, i.e., any inherent inability to issue platicized material at the pressures required in injection molding, parison forming or like operations.

The present invention now proposes a new and novel means for issuing plasticized material from an elastic melt extruder at a pressure different from and, desirably, substantially greater than the pressures normally developed in the melt gap of the extruder itself. Further, the present invention proposes a specific method of and apparatus for the generation of such pressures by normally preventing the issuance of material through the extruder extrusion orifice, accumulating the material from the elastic melt gap, and subsequently issuing the accumulated material at a pressure generated independently of the elastic melt extruder.

Preferably, the plasticized material is accumulated in a reservoir located axially of the elastic melt extruder and also located at least partially within the confines of one of the rotatable plates of the extruder to provide a compact, efficient, thermodynamically desirable structure. By providing a fluid pressure actuated ram for expressing material from the reservoir under pressure, this same ram can be utilized to provide a back-pressure against which material issued from the elastic melt gap can be accumulated. Further, such an apparatus can be sequentially operated in the desired fashion by the utilization of a simple control circuit for controlling the functions of (1) accumulating plasticized material, (2) isolating the plasticized material from material in the elastic melt gap, (3) interconnecting the accumulated material with an outlet orifice, and (4) expressing material under pressure from the reservoir through the orifice.

It is, therefore, an important object of the present invention to provide a new and improved elastic melt extruder from which plasticized material can be issued at pressures in excess of those generally generated in an elastic melt gap.

Another object of the present invention is the provision of an apparatus for issuing plasticized material at a pressure different from that generated in an elastic melt gap by accumulating material from the gap in a reservoir, isolating the reservoir from the gap, and issuing material from the reservoir.

It is a further, and no less important, object of the present invention to provide a new and improved method for extruding plasticized material from an elastic melt gap by accumulating material at the gap output pressure, isolating accumulated material from the gap, and then issuing accumulated material at a pressure substantially greater than that generated in said gap.

On the drawings:

FIGURE 5 is an exploded schematic illustration of the apparatus of FIGURES 1 through 4, having superimposed thereon various hydraulic and electric control components; and FIGURE 6 is a schematic representation of a wiring diagram incorporating certain of the control components of FIGURE 5.

Figure 1:
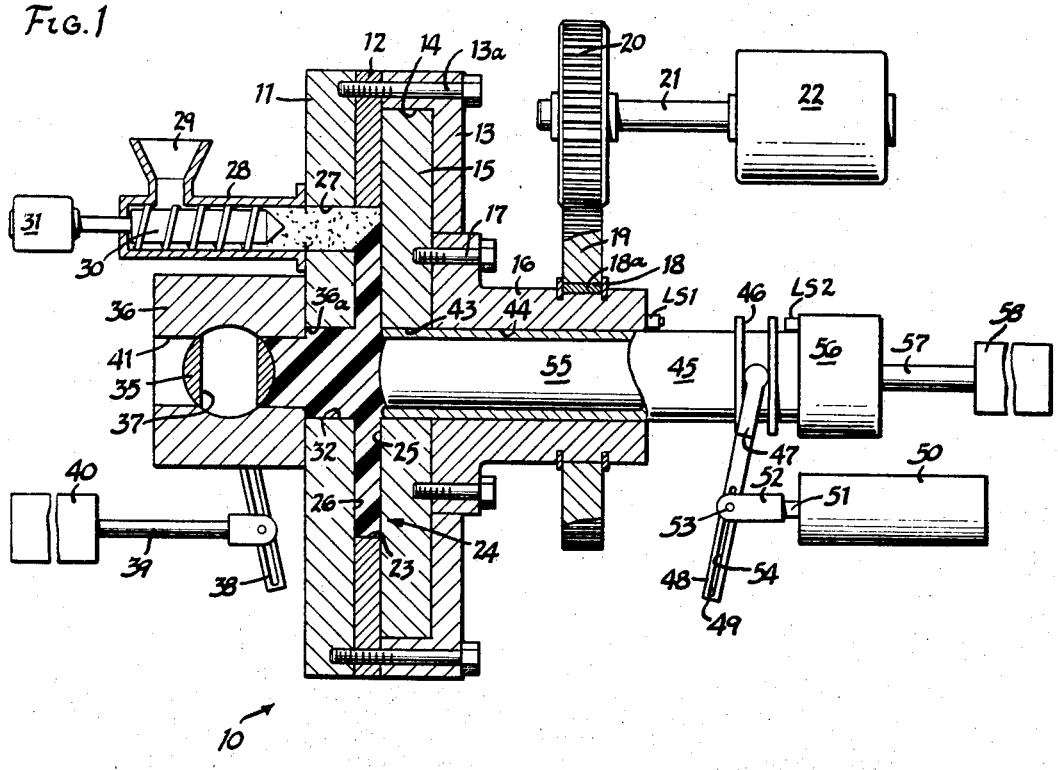
FIGURE 1 is a vertical sectional view, with parts shown in elevation, which is somewhat schematic in nature, but which illustrates an apparatus of the present invention capable of carrying out the method of the present invention.
Figure 2:
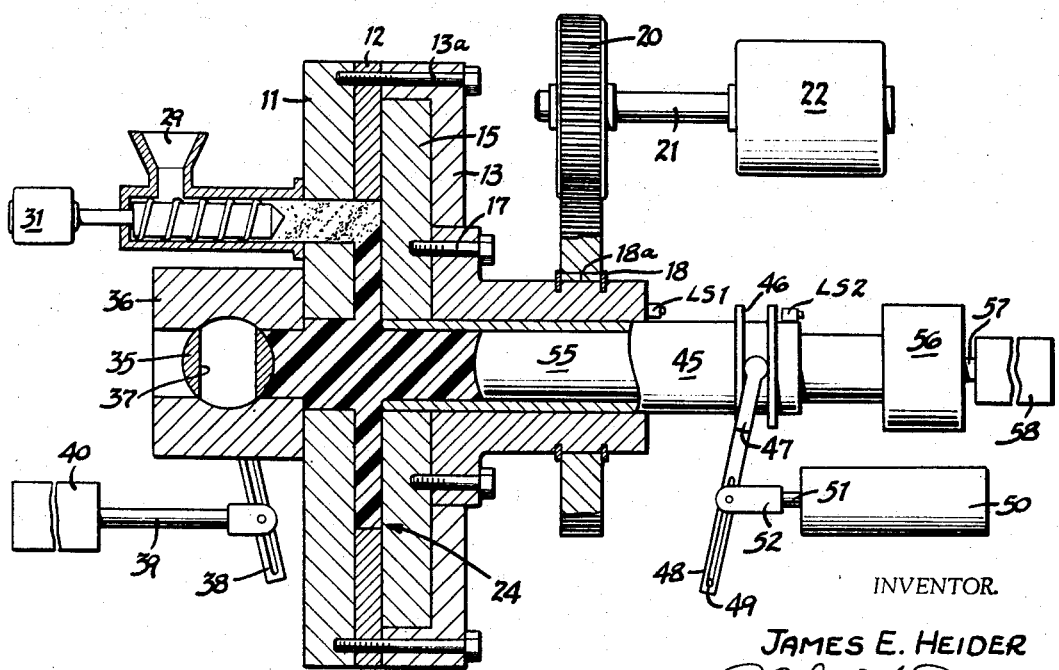
FIGURE 2 is a view similar to FIGURE 1, but showing the apparatus in an adjusted position.

In FIGURE 1, reference numeral 10 indicates an elastic melt extruder of the type illustrated and described in the copending application of Nicholas J. Curto and James E. Henry, Ser. No. 349,241, filed Mar. 4, 1964, and assigned to the assignee of the present invention.

Generally such an extruder comprises a fixed front plate 11, a fixed spacer 12 and a housing 13 secured to the plates 11 and 12 by suitable means, as by bolts 13a. The housing 13 has a cylindrical inner periphery 14 snugly engaging the exterior periphery of a rotatable plate 15 adapted to be driven rotationally by suitable means, as by a drive collar 16 secured thereto by suitable means, as by bolts 17. The drive collar 16 has secured thereto, as by snap rings 18 and a keyway 18a, a peripheral spur gear 19 meshing with a driving gear 20 which, in turn, is driven by the drive shaft 21 of an electric motor 22.

The spacer plate 12 encompasses an interior aperture 23 circumscribing a melt chamber 24, the axial extremities or sides of this melt chamber being defined by the inner face 25 of the rotatable plate 15, and the inner face 26 of the fixed plate 11. Granular plastic material is supplied to the chamber 24 through an aperture in the fixed plate 11, the aperture 27 communicating with a feed barrel 28 receiving such plasticized material by gravity from an overhead hopper 29. A helical screw 30, encased in the barrel 28 and driven by suitable means, as by an electric motor 31, displaces pelletized or particulate material through the barrel 28 and the aperture 27 into the the chamber 24. The fixed plate 11 is further provided with a central outlet orifice 32 from which plasticized material can issue from the chamber 24.

The structure thus described is substantially identical to that illustrated and described in the above-identified Curto and Henry application. The pelletized material introduced into the chamber 24 is plasticized by the "visco-elastic effect" or by the "Weiserman" effect exerted on the material confined between the relatively rotatable surfaces 25, 26, such material issuing through the outlet orifice 32 in plasticized condition.

The output of plasticized material from the chamber 24 is regulated by a rotatable valve body 35 disposed in a surrounding casing 36 and having a radially extending bore 37. The valve body 35 is rotatable by means of a lever arm 38 projecting radially from the valve body 35 and adapted to be actuated by the actuating rod 39 of a fluid pressure actuated cylinder 40.

Figure 4:
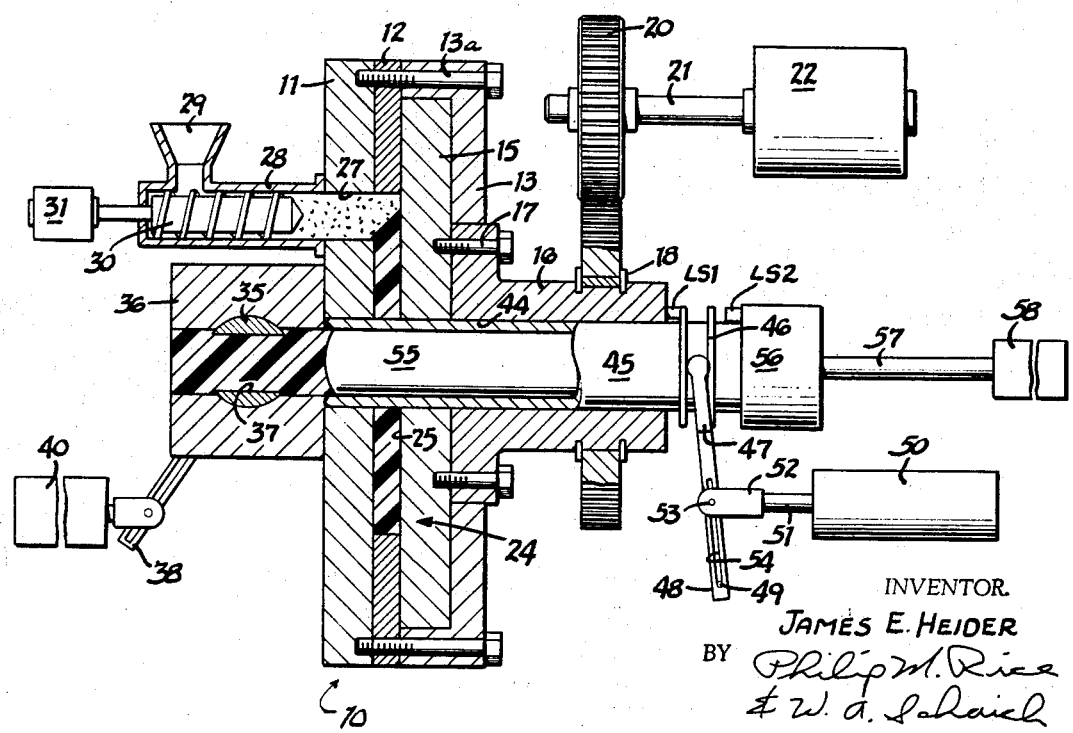
FIGURE 4 is a view similar to FIGURES 1 through 3, but illustrating the apparatus at the conclusion of the issuance of accumulated material.

Actuation of the cylinder 40 to retract the rod 39 moves the valve body 35 from its position of FIGURE 1 (in which the valve body 35 blocks the flow of plasticized material through the dispensing opening 41) to its position of FIGURE 4 wherein the valve body 35 is actuated to align the axial passage or bore 37 with the passage 41.

The rotatable plate 15 is centrally apertured, as at 43, and the drive element 16 is similarly apertured, as at 44, to receive therethrough a valving sleeve 45. This valving sleeve 45 is cylindrical in configuration and fits snugly into the bores 43 and 44 to be relatively axially displaceable therein. The sleeve 45 is so axially displaced by means of an actuating collar 46, which is fixed to the sleeve externally of the drive element 16 and engaged by a bifurcated fork 47 formed as an extension of an actuating lever 48, the lever 48 being pivoted at one end, as at 49. The lever 49 is actuated by means of a cylinder 50 having its actuating rod 51 provided with a connecting clevis 52 bearing a cross pin 53 journaled in a slot 54 formed in the lever 48.

Slidable interiorly of the sleeve 45 is an accumulator piston 55, this piston being cylindrical in configuration and snugly slidably fitting into the sleeve 45, the cylinder projecting axially beyond the confines of the sleeve 45 and being provided at its rear end with an actuating collar 56 for a purpose to be hereinafter more fully described.

The piston 55 is actuated axially of the sleeve 45 by means of the actuating rod 57 of a single acting actuating cylinder 58.

The operation of the device of the present invention will be readily appreciated from a study of the FIGURES 1 through 6, and from a study of the composite hydraulic and electric actuating mechanism of FIGURE 5 of the drawings and the wiring diagram of FIGURE 6 of the drawings.

In the normal operation of the device, the condition of FIGURE 1 prevails, i.e., the cylinder 40 is actuated to extend the actuating rod 39, thereby moving the valve body 35 to its closed position; the cylinder 50 is actuated to retract the actuating rod 51 thereof, thereby positioning the sleeve 45 in its retracted position ouside the gap 24; and the piston 55 is retracted by the abutment of the sleeve 45 with the collar 56 of the piston 55.

As best shown in FIGURE 5 of the drawings, the two motors 22 (driving the rotatable plate 15 through the gear shed 19, 20) and the motor 31 (driving the feed screw 30) receive current from lead lines 60 in which is interposed a motor stop relay CR–1, energization of the relay interrupting the flow of circuit to the motors 22, 31 and stopping the same.

Also, as seen in FIGURE 5, the sleeve 45 is actuated by the cylinder 50 under the control of the control valve V–1. This control valve V–1 supplies fluid under pressure from a source conduit 61 through a passage 62 in the four-way valve body V–1 and a conduit 63. The rear end of the cylinder 50 is drained to a sump 64 by a valve passage 65 and conduit 66. This condition is obtained whenever the valve V–1 is actuated to its illustrated position of FIGURE 5 by energization of a solenoid S–1. To extend the sleeve 49, the four-way valve body V–1 is actuated to the left by means of solenoid S–2 so that fluid under pressure from the source conduit 61 flows through valve passage 67 into the conduit 66, the line 63 being vented to the sump 64 by means of the valve passage 68. Thus, energization of the solenoid S–2 will shift the valve body V–1 to the left and thereby extend the piston rod 51 and move the sleeve 45 to its extended position of FIGURES 3 and 4.

The cylinder 58 for the piston 55 is actuated by a means of a two-way valve V–2. This valve V–2 is urged to its illustrated position by means of a spring 70, while the solenoid S–3 can be energized to displace the valve body V–2 to the left, against the bias of the spring 70.

When the valve is in its illustrated position, valve passage 71 interconnects a conduit 72 communicating with the rear of the cylinder 58 to the sump 64. Interposed in the conduit 72 is a check valve 73 preventing flow directly through the conduit 72, this check valve being by-passed by a pressure relief valve 74, capable of establishing a predetermining back-pressure in the cylinder 58 for a purpose hereinafter to be more fully described.

The cylinder 40 actuating the valve body 35 through the lever 38 is actuated by a four-way valve V–3 urged to its illustrated lefthand position by means of a spring 75 so as to interconnect the rear end of the cylinder 40 by conduit 76 and valve passage 77 with the fluid pressure conduit 61. The forward end of the cylinder 40 is normally connected to the sump 64 by means of a valve passage 78 and the conduit 80. Upon actuation of the solenoid S–4, the pressure conduit 61 is connected to the forward piston conduit 80 by means of valve passage 81 while the rear end conduit 76 for the cylinder is connected to the sump 64 by a valve passage 62.

Thus, to obtain the condition of FIGURE 1 of the drawings, the valves V–1, V–2 and V–3 are positioned as illustrated in FIGURE 5 of the drawings, and the relay CR–1 is not actuated, so that the motors 22 and 31 are operating. Under these circumstances, operation of the motor 31 supplies pelletized material to the melt chamber 24, this material being plasticized by the visco-elastic effect to substantially fill the chamber and the orifice 32. This material cannot escape from the chamber nor be expressed through the orifice inasmuch as the valve body 35 is closed.

The continued rotation of the rotatable plates 15 and the continued plasticization of the material will build up a pressure within the chamber 24, this pressure being exerted upon the end face of the piston 55. When this pressure exceeds the back-pressure determined by the pressure relief valve 74 at the rear end of the cylinder 58, the piston 55 will be forced rearwardly, hydraulic fluid going through conduit 72, the pressure relief valve 74, the valve passage 71 and into the sump 64. The accumulation of material internally of the sleeve 45 and in advance of the piston 55 will continue until such time as the primary actuating switch 85 (see FIGURE 6) is closed.

This primary actuating switch 85 may be closed by any desired external event, such as the closing of the contacts of the timer, the completion of some external forming operation, such as an injection molding or blow molding operation, or the like. Alternatively, the switch 85 may be closed in response to a degree of displacement of the piston 55 indicating that a desired volume of plasticized material has been accumulated in advance of the piston.

Upon closure of the switch 85, the circuit is completed between the electrical leads 86 to actuate the solenoid S–2. Actuation of the solenoid S–2 displaces the valve body V–1 to the left so that pressure liquid can flow from the pressure conduit 61 through the valve passage 67 and the conduit 66 to the rear end of the cylinder 50, return flow being vented to the sump 64 through the conduit 63 and the return passage 68. Accordingly, the piston rod 51 will be extended to rock the lever 58 in a counterclockwise direction, thereby displacing the sleeve 45 to the position illustrated in FIGURE 3 of the drawings, wherein the sleeve forward end abuts a shoulder 36a formed at the intersection of the orifice 32 and the relatively reduced bore 41 in the block 36.

Figure 3:
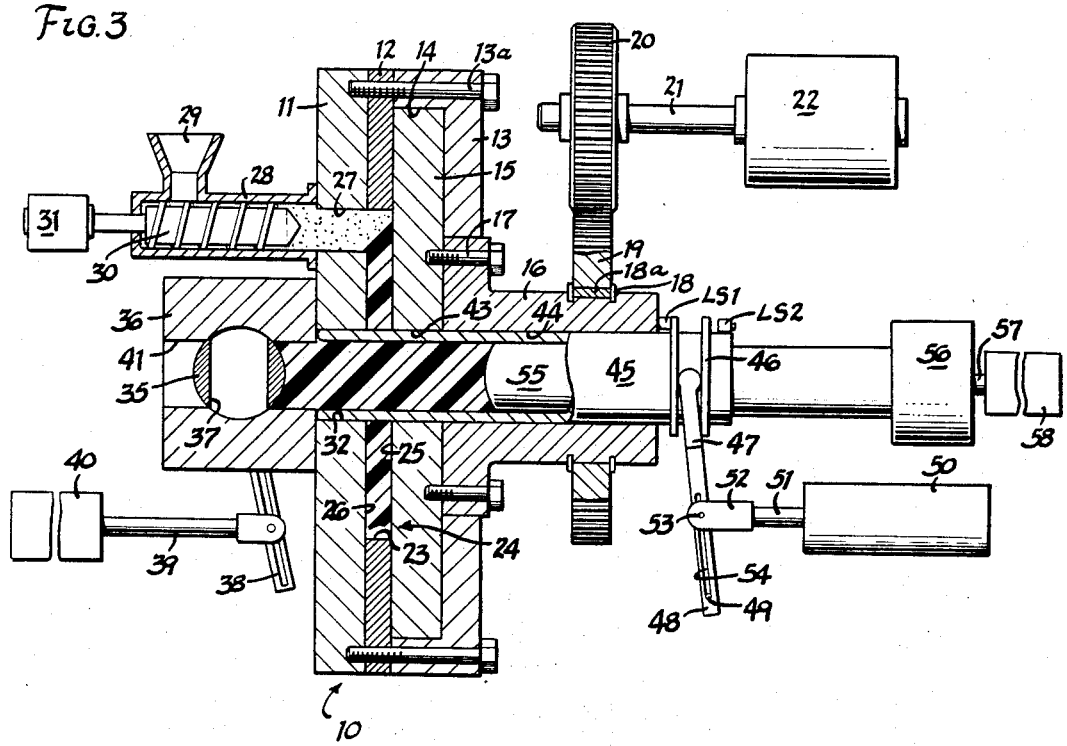
FIGURE 3 is a view similar to FIGURES 1 and 2, but showing the apparatus in another adjusted position preparatory to the issuance of the accumulated material.

Upon actuation of the sleeve to the position of FIGURE 3, collar 46 contacts the limit switch LS–1 to close the same. Closure of the limit switch LS–1 will simultaneously actuate the solenoid S–3 plus actuating the valve V–2 (to its leftward position against the spring 70), the solenoid S–4 (actuating the valve V–3 to its leftward position against the bias of the spring 75) and actuating the relay CR–1.

Actuation of the relay CR–1 will immediately shut off current flow to the motors 22 and 31, thereby stopping rotation of the plate 15 and of the screw 13. Actuation of the valve V-2 will place the conduits 72 in communication with the supply conduit 61 by means of the valve passage 79, fluid pressure flowing through the check valve 73 and into the rear end of the cylinder 58 to displace the piston rod 57 thereof, and the accumulator piston 55 forwardly in the sleeve 45 to the position illustrated in FIGURE 4 of the drawings.

Simultaneously, actuation of the solenoid S-4 will displace the valve V-3 to the left so as to open the valve 35. This is accomplished by supplying pressure fluid to the forward end of the cylinder 40 through conduits 60, valve passage 81 and conduit 80, while draining the rear end of the cylinder 40 through conduit 76, valve passage 82 and the sump 84. Of course, displacement of the piston to its closed position will express plasticized material entrapped in the sleeve forwardly through the valve body passage 41 for utilization in a forming operation or the like.

When the piston 55 attains its forwardmost position, the radially enlarged actuating collar 56 at the rear end thereof will actuate limit switch LS-2. Closure of the limit switch LS-2 will actuate solenoid S-1, thereby displacing the valve body V-1 to the right, the solenoid S-2 being previously deenergized by opening of the switch contact 85. Actuation of the solenoid S-1 will return the valve body V-1 to its illustrated position of FIGURE 5, pressure fluid flow through the conduit 61, the valve passage 62 and the conduit 63 retracting the piston rod 51 and displacing the sleeve 45 to the right. Such displacement of the sleeve will reopen the limit switch LS-1, thereby deenergizing the solenoids S-3, S-4 and CR-1. Further, contacts between the rear end of the sleeve 45 and the actuating collar 56 of the piston 55 will displace the piston rearwardly with the sleeve to the position illustrated in FIGURE 1 of the drawings.

Thus, the cycle of operation of the device of the present invention will be completed.

While a preferred embodiment of the invention has been shown and described, it is to be understood that the invention is not to be limited in its application to the details of construction and arrangement of parts illustrated in the accompanying drawings, since the invention is capable of other embodiments and of being practiced or carried out in various other ways. Also, it is to be understood that the phraseology or terminology employed herein is for the purpose of description and not of limitation.

I claim:

1. In an elastic melt extruder having a pair of relatively rotatable plates having an axis of rotation and defining a melt gap therebetween and means to supply nonplasticized thermoplastic material to the periphery of the gap for centripetal flow through the gap to issue therefrom at a predetermined relatively low output pressure, the improvements of a reservoir for plasticized material coaxial with the axis of relative rotation of said plates and having an outlet orifice, actuatable first valve means controlling said orifice, said first valve means being openable to accommodate the flow of material through said orifice and closable to prevent such flow, actuatable second valve means openable to accommodate the flow of plasticized material from said gap into said reservoir and closable to prevent such flow, a pressurizing ram located in said reservoir and movable therein (1) in a first direction to express plasticized material from said reservoir through said orifice at a pressure different from said output and (2) in a second direction to accommodate the entry of plasticized material at said output pressure into said reservoir from said gap, actuatable power means for (1) moving said ram in said first direction and (2) resisting movement of said ram in said second direction, and control means correlating actuation of said power means, said second valve means and said first valve means (1) to close said first valve means and to open said second valve means to fill said reservoir from said gap and against the resistance of said power means, and then (2) to open said first valve means and to close said second valve means when said power means is actuated to move said ram in said first direction to issue material from said reservoir without backfeeding the material to said gap.

2. An extruder as defined in claim 1, further characterized by said reservoir and said second valve means being concentric and coaxial with said axis of rotation, said second valve means being cylindrical in configuration and telescopically receiving said ram therein.

3. An extruder as defined in claim 2, further characterized by said second valve means being axially displaceable relative to said gap to accommodate (1) filling of said reservoir from said gap when open and (2) isolating said gap from said reservoir when closed, and means for actuating said ram power means in said first direction in response to displacement of said second valve means to its said closed position.

4. An extruder as defined in claim 3, further characterized by means for actuating said first valve means in response to displacement of said second valve means, said first valve means being openable only when said second valve means is in its said closed position.

5. In a method of extruding plasticized material from an elastic melt gap defined between relatively rotatable plates, one of which plates has an extrusion orifice, the steps of normally preventing the issuance of material through said orifice, accumulating a body of material issued from said gap in a reservoir communicating with said gap, said reservoir being in axial alignment with said orifice and lying at least partially within the confines of one of said plates, then (1) isolating said reservoir from said gap, (2) accommodating the issuance of material from said orifice, and (3) pressurizing the material in said reservoir, thereby issuing material from said reservoir and through said orifice at a pressure different from the pressure normally developed in said gap, and then again preventing the issuance of material from said orifice while accumulating another body of material from said gap.

6. The method as defined in claim 5 wherein steps (2) and (3) of claim 5 are performed in response to and only after the performance of step (1) thereof.

7. The method as defined in claim 5 wherein step (3) is performed by advancing a fluid pressure actuated ram into said reservoir and said body of material is accumulated under the output pressure normally developed in said gap.

References Cited

UNITED STATES PATENTS 3,256,568   6/1966   Stenger _____ 18—12
3,351,694   11/1967  Curto et al. _____ 264—176

ROBERT F. WHITE, *Primary Examiner.*

G. AUVILLE, *Assistant Examiner.*